(12) United States Patent
Wong et al.

(10) Patent No.: US 12,327,227 B2
(45) Date of Patent: *Jun. 10, 2025

(54) SECURED INTEGRATION OF THIRD-PARTY LOGIC IN ELECTRONIC TRANSACTION PROCESSING

(71) Applicant: PayPal, Inc., San Jose, CA (US)

(72) Inventors: Shek Hei Wong, Singapore (SG); Chun Kiat Ho, Singapore (SG); Li Wei Lu, Singapore (SG)

(73) Assignee: PAYPAL, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/379,918

(22) Filed: Oct. 13, 2023

(65) Prior Publication Data

US 2024/0152885 A1 May 9, 2024

Related U.S. Application Data

(63) Continuation of application No. 17/107,145, filed on Nov. 30, 2020, now Pat. No. 11,823,145.

(51) Int. Cl.
*G06Q 20/08* (2012.01)
*G06F 21/55* (2013.01)
(Continued)

(52) U.S. Cl.
CPC ....... *G06Q 20/0855* (2013.01); *G06F 21/554* (2013.01); *G06Q 20/102* (2013.01); *G06Q 20/40145* (2013.01); *G06Q 20/4016* (2013.01)

(58) Field of Classification Search
CPC .................. G06Q 20/00–425; G06F 21/00–88
See application file for complete search history.

(56) References Cited

U.S. PATENT DOCUMENTS

| | | | |
|---|---|---|---|
| 7,415,699 B2 * | 8/2008 | Gouriou | G06F 9/4843 717/124 |
| 9,324,098 B1 * | 4/2016 | Agrawal | G06Q 30/04 |

(Continued)

OTHER PUBLICATIONS

Leymann et al. Workflow-based applications, 1997, IBM System Journal, vol. 36, No. 1 (Year: 1997).*

*Primary Examiner* — Chenyuh Kuo
(74) *Attorney, Agent, or Firm* — Haynes and Boone, LLP

(57) ABSTRACT

Methods and systems are presented for providing a framework to securely integrate third-party logic into electronic transaction processing workflow. Third-party programming code that implements different third-party logic may be obtained and stored in a repository. A transaction processing request is received from a third-party server, and an instance of a transaction processing module is instantiated within an operating runtime environment to process a transaction according to a workflow. When the instance of the transaction processing module has reached an interruption point, the instance of the transaction processing module is suspended, and a third-party programming code is executed within an isolated runtime environment. The third-party programming code is configured to provide an output value based on attributes of the transaction. The instance of the transaction processing module then determines whether to authorize or deny the transaction based in part on the output value.

20 Claims, 6 Drawing Sheets

(51) Int. Cl.
    *G06Q 20/10*       (2012.01)
    *G06Q 20/40*       (2012.01)

(56) References Cited

U.S. PATENT DOCUMENTS

| | | | |
|---|---|---|---|
| 10,032,160 B2 * | 7/2018 | Desai | G06Q 10/067 |
| 11,823,145 B2 * | 11/2023 | Wong | G06Q 20/12 |
| 2002/0194181 A1 * | 12/2002 | Wachtel | G06F 16/972 |
| 2013/0041770 A1 * | 2/2013 | Raman | G06Q 30/06 |
| | | | 705/21 |
| 2014/0025581 A1 * | 1/2014 | Calman | G06Q 20/385 |
| | | | 705/65 |
| 2014/0207927 A1 * | 7/2014 | Fichtenholtz | H04L 67/51 |
| | | | 709/223 |
| 2016/0110798 A1 * | 4/2016 | Woo | G06Q 30/0613 |
| | | | 705/26.8 |
| 2016/0132880 A1 | 5/2016 | O'Regan et al. | |
| 2016/0314460 A1 * | 10/2016 | Subramanian | G06Q 20/12 |
| 2017/0193590 A1 * | 7/2017 | Nair | G06Q 30/0613 |
| 2017/0278096 A1 | 9/2017 | Chitalia et al. | |
| 2020/0348913 A1 * | 11/2020 | Cerar | G06F 8/20 |

\* cited by examiner

SECURED INTEGRATION OF THIRD-PARTY LOGIC IN ELECTRONIC TRANSACTION PROCESSING

CROSS REFERENCE TO RELATED APPLICATIONS

The present invention is a Continuation of U.S. patent application Ser. No. 17/107,145, filed Nov. 30, 2020, the disclosure of which is incorporated herein by reference in its entirety.

BACKGROUND

The present specification generally relates to electronic transaction processing, and more specifically, to securely integrating third-party logic in the transaction processing according to various embodiments of the disclosure.

RELATED ART

Technologies used for processing electronic transactions are becoming more sophisticated and advanced, especially with the stringent requirements for securely storing sensitive information of users, such as financial information, health information, identity information, etc. Most of the organizations that provide online services do not have the expertise to implement such technologies, and may outsource the implementation of transaction processing to specialized technology companies.

For example, many online merchants do not have the capability to implement secure electronic payment processing through their online interface (e.g., their website, their mobile applications, etc.). Not only are the technologies involved in the processing of electronic payments sophisticated, the requirements for storing financial data can be burdensome as well. In order to avoid the burden associated with storing and processing electronic payments, an online merchant may outsource the implementation of processing electronic payments to an online payment service provider, such as PayPal®. In some instances, when a customer initiates a transaction (e.g., a payment transaction, etc.) on a merchant website of the online merchant, the merchant server (or a third-party server) that hosts the merchant website may hand off the transaction workflow to the payment service provider server to process the electronic transaction. The payment service provider server may return the control of the workflow to the merchant server only after the transaction process is complete (e.g., approved/confirmed or rejected).

While offloading the electronic transaction processing to the payment service provider alleviates the burden of the merchant, it also prevents the merchant from exerting any control over the electronic payment process. Thus, there is a need for developing a framework that allows third-party logic to be integrated into a transaction processing flow.

Figure 1:
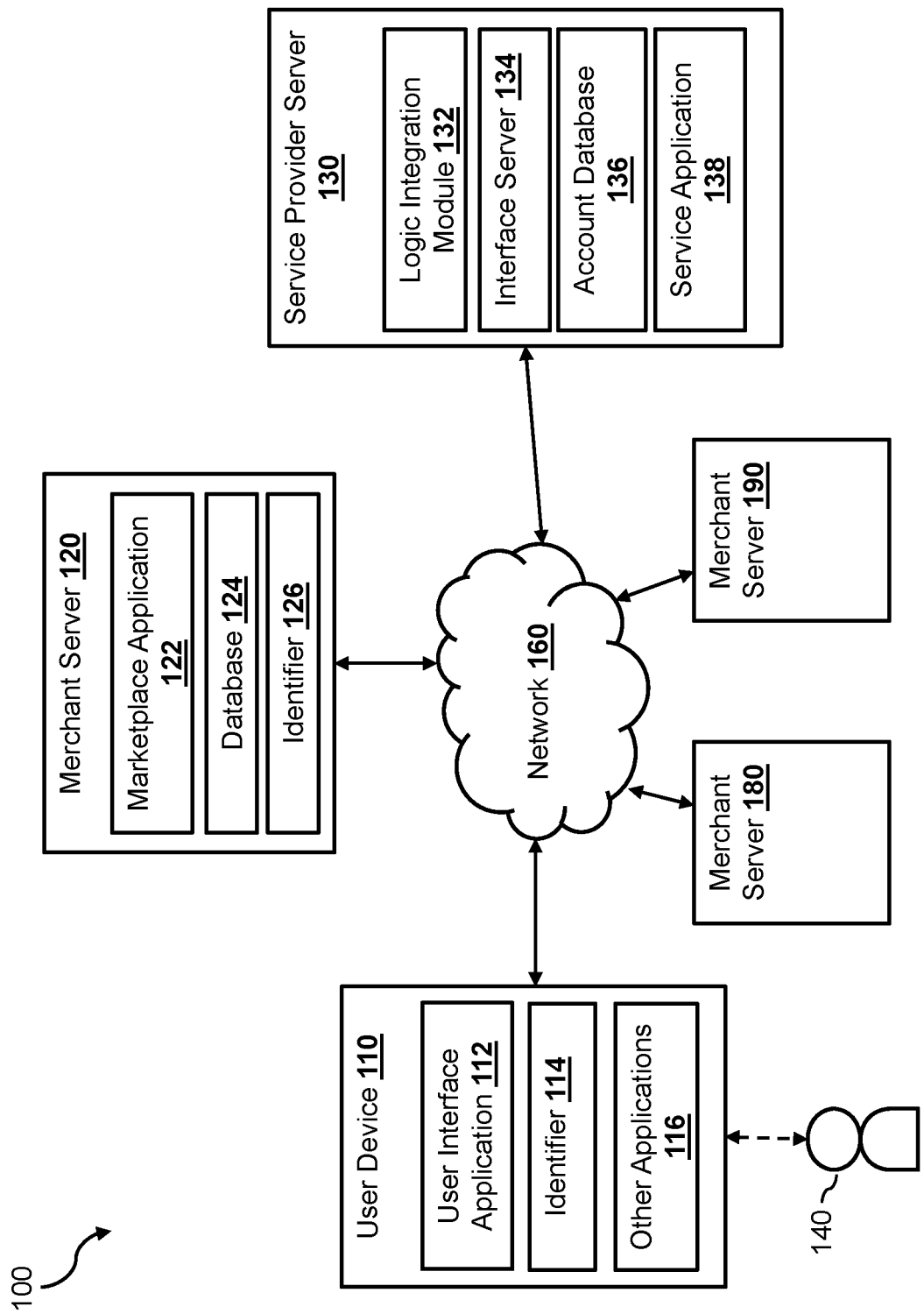
FIG. 1 is a block diagram illustrating an electronic transaction system according to an embodiment of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The present disclosure includes methods and systems for providing a framework to securely integrate third-party logic into electronic transaction processing. The third-party logic may be associated with third-party organizations that provide online services to users. Examples of third-party organizations may include merchants, government agencies, content providers, data centers, etc. For example, a merchant may provide a user interface (e.g., a website, a mobile application, etc.) that enables users to browse different products and/or services offered by the merchant. The merchant may also enable the user to initiate electronic transactions (e.g., electronic payment transactions, order tracking transactions, log in transactions, etc.) via its user interface. In another example, a data center may provide a user interface (e.g., a website, a mobile application, etc.) that enables authorized users to access different types of data. The data center may verify an identity of the user based on an electronic authentication process.

As discussed above, some of the electronic transaction processing can be sophisticated, burdensome, or both. For example, processing electronic payment transactions can involve sophisticated computer technologies (including hardware and software components) for securely transmitting sensitive data (e.g., financial data) over the Internet, authenticating payment transactions, processing and/or storing financial data, etc. In another example, user identity verification can also involve sophisticated computer technologies for securely transmitting sensitive data (e.g., credential data, user identity data, etc.) over the Internet and identity data processing such as facial recognition, fingerprint/iris matching, etc. The third-party organizations, such as online merchants, data centers, etc., may not have the expertise or capability to properly implement and maintain the hardware and/or the software for performing these electronic transaction processing, and may outsource the technical aspects of such electronic transaction processing to a service provider.

A common technique for a third-party organization to outsource a particular electronic transaction processing is temporarily handing control off to a service provider for handling the processing of an electronic transaction. For example, when an electronic transaction is initiated from the user interface of the third-party organization (e.g., the user of a merchant selecting a "check out" button on the merchant website, a user selecting a "log in" button on a website, etc.), a server of the third-party organization may redirect the user to a service provider server of the service provider for processing the electronic transaction (e.g., to process an electronic payment transaction, to process an authentication transaction, etc.). The service provider server may perform the electronic transaction for the user. For example, to perform an electronic payment transaction, the service provider server may prompt the user for additional information (e.g., payment card information, a shipping address, etc.) and may process an electronic transaction based on the additional information. In another example, to authenticate a user, the service provider server may prompt the user for user credential data (e.g., a fingerprint, an iris scan, a password, etc.), and may determine whether the user is authenticated based on the received user credential data. After performing the electronic transaction, the service provider server may return the control back to the server of the third-party organization (e.g., by redirecting the user back to the merchant website, etc.). The service provider server may also return an indication indicating a result of the electronic transaction (e.g., whether the electronic payment transaction is approved or denied, whether the user is authenticated, etc.) to the third-party organization server. The server of the third-party organization may continue to interact with the user based on the result. By handing off the control to the service provider server, the third-party organization may avoid the burden of implementing/maintaining the technologies for processing the electronic transaction and for handling/storing of sensitive user data in association with the electronic transaction.

However, by outsourcing the processing of electronic transactions to the service provider server, the third-party organization may be restricted from exerting any control over the processing of the electronic transactions. The service provider server may process electronic transactions (e.g., electronic payment transactions) in the same manner indiscriminately for all of the third-party organizations (e.g., for all merchants), without considering any unique characteristics of individual third-party organizations. In some instances, a third-party organization may have certain preferences in handling certain types of electronic transactions based on its internal policies or different rules and restrictions imposed on the third-party organization (e.g., export control, etc.). For example, a merchant may wish to deny purchases having a shipping address associated with a particular geographical region. In another example, a data center may wish to deny access for authorized users who are logging in from another geographical region. By using the service provider server to process the electronic transaction, the third-party organization may not be able to handle such unique situations efficiently.

One solution is for the service provider to implement customized implementations of electronic transaction processing for at least some of the third-party organizations. For example, based on specifications provided by the third-party organizations, the service provider may develop and implement different versions of electronic transaction processing modules, and may store the different versions of the electronic transaction processing modules on the service provider server. The service provider may then use the customized electronic transaction processing modules for processing electronic transactions for the corresponding third-party organizations. However, building customized electronic transaction processing modules for individual third-party organizations can be costly, rendering the outsourcing of the electronic transaction processing economically inefficient.

Another solution is to allow third-party organizations to submit customized logic (third-party logic), that may be in the form of third-party programming code, to the service provider server. The service provider server may receive different third-party programming code associated with different third-party organizations. When the service provider server receives a request from a server associated with a particular third-party organization, the service provider server may access particular third-party programming code corresponding to the particular third-party organization, and may use the particular third-party programming code to process the electronic transaction for the third-party organization. However, this solution is problematic as well. First, one of the reasons for outsourcing the implementation and execution of the electronic transaction processing is that it requires sophisticated computer hardware and software technologies to properly implement and execute the electronic transaction processing, of which the third-party organizations may not have the expertise or capability of doing. Thus, reverting the implementation of at least part of the electronic transaction processing back to the third-party organizations may defeat the original purpose of outsourcing such processing to the service provider. Second, executing third-party programming code within the service provider's operating environment can be risky as any malicious code (intentionally or unintentionally inserted by the third-party organization) included in the third-party programming code can detrimentally affect the service provider server (e.g., shutting the server down, accessing and transmitting sensitive data to malicious party outside of the service provider, interrupting services provided by the service provider server, etc.).

Thus, according to various embodiments of the disclosure, a logic integration system may provide a framework that enables third-party logic associated with different third-party organizations to be securely integrated within the electronic transaction processing of the service provider server. In some embodiments, the framework may include an isolated runtime environment. The isolated runtime environment may be separate from the operating runtime environment in which the transaction processing module of the service provider is executed. The isolated runtime environment may also be isolated from a network external to the service provider. In some embodiments, the isolated runtime environment may provide a secured environment for third-party programming code to be executed by restricting the third-party programming code from accessing critical system resources such as network resources (e.g., a network card, a port, etc.) and system resources (e.g., registry, system-level functionalities, etc.). For example, a firewall may be disposed between the isolated runtime environment and a network (e.g., an internal network of the service provider, an external network, the Internet, etc.) that can be configured by the logic integration system to block any outbound traffic. Any third-party programming code being executed within the isolated environment may also be assigned restricted rights (e.g., non-administrator level rights, etc.). When a third-party programming code is being executed within the isolated environment, the third-party programming code is allocated a fixed amount of memory for executing the third-party logic, but may be restricted from accessing any other memory space within the system.

In addition, in order to prevent the third-party logic from unpredictably interfering with the transaction processing module, the logic integration system may inject one or more interruption points within the transaction processing module, where the third-party programming code may be executed to provide additional logic for the processing of transactions. Thus, the third-party programming logic may only be executed at the predetermined one or more particular points of a workflow related to processing electronic transactions. In addition, the third-party programming code may be required to have a predetermined interface for accepting a fixed number of pre-defined parameters and one or more predetermined return values.

Based on the predetermined interface specified by the service provider (e.g., the predetermined set of parameters and the required output(s), etc.), a third-party organization may implement third-party logic in the form of third-party programming code. The transaction processing module may be configured to process transactions with or without the third-party logic. When no third-party logic is triggered, the transaction processing module may be configured to process electronic transactions in a default manner. Thus, the third-party logic does not replace, but merely supplements, the transaction processing module.

In one example, for processing electronic payment transaction, the set of input parameters for the third-party programming code may include a shipping address for the purchase. A merchant may implement third-party logic that returns a first value indicating that the shipping address is valid (e.g., '1') when the shipping address is not associated with a particular geographical region and returns a second value indicating that the shipping address is invalid (e.g., '0') when the shipping address is associated with the particular geographical region. In another example, for a user authentication transaction, the set of parameters may include an Internet Protocol (IP) address of a device from which the data request is initiated. A data center may implement third-party logic that returns a value indicating that the IP address is valid (e.g., '1') when the IP address is not associated with a particular geographical region and returns a value indicating that the IP address is invalid (e.g., '0') when the IP address is associated with a particular geographical region.

Thus, the third-party organizations may only need to implement simple third-party logic (e.g., performing one or more computations based on the one or more parameters and produce an output) as part of the whole transaction processing workflow, instead of implementing the entirety (or a substantial portion) of a transaction processing module on its own. Furthermore, since the transaction processing module can function (e.g., process electronic transactions) properly without the third-party logic, the transaction processing module may still properly process electronic transactions when the third-party programming code has errors. In some embodiments, the logic integration system may provide additional error handling features for the third-party programming code, which will be described in more detail below. The logic integration system may obtain third-party programming code that implements different third-party logic from different third-party organizations. The logic integration system may store the third-party programming code in a repository.

In some embodiments, upon receiving third-party programming code from a third-party organization, the logic integration system may analyze the third-party programming code before storing the third-party programming code in the repository. The logic integration system may analyze the third-party programming code to detect whether the third-party programming code contains any error (e.g., would cause an infinite loop, would not return the predetermine output value, etc.) and/or malicious code, such as code for accessing a variable other than one of the input parameters for the third-party programming code, accessing an external network, transmitting data to another device via a network, accessing system resources (e.g., system files, registry, etc.) that are not allowed, etc. When the logic integration system detects an error or malicious code within the third-party programming code, the logic integration system may reject the third-party programming code. The logic integration system may not store the third-party programming code in the repository and may transmit a notification indicating such problem(s) to the third-party organization.

When a server of a third-party organization receives an indication of a user initiating an electronic transaction (e.g., a user selecting a "check out" button on a merchant website, a user selecting a "login" button on a website, etc.), the server of the third-party organization may transmit an electronic transaction processing request to the service provider server. In some embodiments, the server of the third-party organization may redirect the user to an interface of the service provider server. The service provider server may execute the transaction processing module within an operating runtime environment. The operating runtime environment may provide the transaction processing module access to resources for processing the electronic transaction, such as access to other servers and/or databases within an internal network of the service provider, access to the Internet, access to the user device that initiates the electronic transaction, access to library of programming code and system resources, etc.

The transaction processing module of the service provider server may begin a workflow to process the electronic transaction within the operating runtime environment. In some embodiments, the transaction processing module may communicate with a user device of a user to prompt the user for additional data, such as a shipping address, payment card information, user credential data, etc. As the transaction processing module is being executed to process the electronic transaction according to the workflow, the transaction processing module may determine that it has reached an interruption point within the workflow. In response to determining that it has reached the interruption point within the workflow, the transaction processing module may initiate a third-party programming code for execution, via the logic integration system. Since different third-party programming code associated with different third-party organizations may be stored in the repository, in some embodiments, the logic integration system may identify a particular third-party programming code based on an identity of the third-party organization that initiated the electronic transaction request. The logic integration system may then execute the particular third-party programming code within the isolated runtime environment. In some embodiments, the logic integration system may pass a predetermined set of parameters to the third-party, such as at least some of the data obtained from the user by the transaction processing module via the user interface of the service provider server.

Since the third-party programming code is executed within the isolated runtime environment, the risk of harm to the service provider caused by executing the third-party programming code is reduced. It is because the isolated runtime environment prevents any data from being transmitted to any module or device external to the isolated runtime environment (e.g., other devices, servers, or modules associated with the service provider server, an external device outside of the service provider server, etc.) and restricts access of the third-party programming code to any critical system files or resources. Thus, any effect from executing the third-party programming code remains within the isolated runtime environment. Furthermore, executing the third-party programming code within the isolated runtime environment enables the third-party organizations to be insulated from risk and liability arising from handling of sensitive user data, such as financial data, user identifiable data, health data, user credential data, etc., because the data that is provided to and used by the third-party logic remains within the control of the service provider server without being exposed to the third-party organization.

In some embodiments, while the third-party programming code is being executed within the isolated runtime environment, the logic integration system may monitor the execution of the third-party programming code to determine any malicious activity being attempted by the third-party programming code. For example, the logic integration system may analyze the resources being accessed by the third-party programming code, function call(s) being made the third-party code, etc. If the logic integration system detects that the third-party programming code attempts to perform any restricted activity (e.g., accessing an external network, transmitting data to another device via a network, accessing system resources, etc.), the logic integration system may abort the execution of the third-party programing code. In addition, the logic integration system may timeout the execution of the third-party programming code when the runtime of the third-party programing code exceeds a predetermined threshold (e.g., when the third-party programming code is in an infinite loop, etc.). The logic integration system may then resume the workflow of the transaction processing module and may provide an indication to the transaction processing module that the third-party programming code was aborted in error such that the transaction processing module may process the transaction using its default logic.

After processing the set of parameters using the third-party logic, the third-party programming code may return one or more values. The logic integration system may pass the return value(s) back to the transaction processing module such that the transaction processing module may resume the workflow of processing the electronic transaction based on the returned value(s). In an example where the electronic transaction is an electronic payment transaction associated with a purchase from a merchant, based on the returned value(s), the transaction processing module may determine that the shipping address is not supported by the third-party organization (e.g., the merchant). Thus, the transaction processing module may deny the electronic payment transaction while the transaction processing module is still interacting with the user, even though the transaction processing module would otherwise authorize the electronic payment transaction without the third-party logic. In another example when the electronic transaction is a user authentication transaction, based on the returned value(s), the transaction processing module may determine that the user cannot access a data center based on an IP address of the device used by the user to access the data center, even though the transaction processing module has determined that the user is otherwise authenticated based on the credential data received from the user. It is noted that even though the third-party logic of the third-party organization indicates that the transaction is authorized, the transaction processing module may still deny the transaction based on other factors, such as risks, payment card expired, and the like.

As such, the transaction processing module may authorize or deny the electronic transaction using both its proprietary logic (the default processing) and the third-party logic securely based on the techniques described herein. After processing the electronic transaction, the transaction processing module may present a notification on the user device indicating whether the transaction has been processed or denied. In some embodiments, the transaction processing module may return control back to the server of the third-party organization (e.g., redirecting the user back to the user interface of the third-party organization such as the merchant website). In some embodiments, the transaction processing module may indicate, via the redirect (e.g., a hypertext transfer protocol (HTTP) redirect, etc.), information regarding the processing of the electronic transaction. For example, the information may indicate whether the transaction has been completed or denied. In the case where the transaction has been declined by the transaction processing module, the information may indicate a reason for the decline (e.g., payment card has expired, invalid card number, or by the third-party logic implemented by the third-party organization). The server of the third-party organization may continue to interact with the user based on the information passed by the transaction processing module.

FIG. 1 illustrates an electronic transaction system 100, within which the logic integration system may be implemented according to one embodiment of the disclosure. Note that the present techniques may be applied in many different computing and technological environments, however, and are not limited to those shown in the figures. The electronic transaction system 100 includes a service provider server 130, merchant servers 120, 180, and 190, and a user device 110 that may be communicatively coupled with each other via a network 160. The network 160, in one embodiment, may be implemented as a single network or a combination of multiple networks. For example, in various embodiments, the network 160 may include the Internet and/or one or more intranets, landline networks, wireless networks, and/or other appropriate types of communication networks. In another example, the network 160 may comprise a wireless telecommunications network (e.g., cellular phone network) adapted to communicate with other communication networks, such as the Internet.

The user device 110, in one embodiment, may be utilized by a user 140 to interact with the merchant servers 120, 180, and 190, and/or the service provider server 130 over the network 160. For example, the user 140 may use the user device 110 to conduct an online purchase transaction with the merchant server 120 via websites hosted by, or mobile applications associated with, the merchant server 120 respectively. The user 140 may also log in to a user account to access account services or conduct electronic transactions (e.g., account transfers or payments) with the service provider server 130. In some embodiments, the user device 110 may also interact with any one of the merchant servers 120, 180, and 190 by communicating with a point-of-sale (POS) device (e.g., a payment card reader, etc.) associated with the merchant servers 120, 180, and 190. The user device 110, in various embodiments, may be implemented using any appropriate combination of hardware and/or software configured for wired and/or wireless communication over the network 160. In various implementations, the user device 110 may include at least one of a wireless cellular phone, wearable computing device, PC, laptop, etc.

The user device 110, in one embodiment, includes a user interface (UI) application 112 (e.g., a web browser, a mobile payment application, etc.), which may be utilized by the user 140 to interact with the merchant servers 120, 180, and 190 and/or the service provider server 130 over the network 160. In one implementation, the user interface application 112 includes a software program (e.g., a mobile application) that provides a graphical user interface (GUI) for the user 140 to interface and communicate with the service provider server 130 and/or the merchant server 120 via the network 160. In another implementation, the user interface application 112 includes a browser module that provides a network interface to browse information available over the network 160. For example, the user interface application 112 may be implemented, in part, as a web browser to view information available over the network 160.

The user device 110, in various embodiments, may include other applications 116 as may be desired in one or more embodiments of the present disclosure to provide additional features available to the user 140. In one example, such other applications 116 may include security applications for implementing client-side security features, programmatic client applications for interfacing with appropriate application programming interfaces (APIs) over the network 160, and/or various other types of generally known programs and/or software applications. In still other examples, the other applications 116 may interface with the user interface application 112 for improved efficiency and convenience.

The user device 110, in one embodiment, may include at least one identifier 114, which may be implemented, for example, as operating system registry entries, cookies associated with the user interface application 112, identifiers associated with hardware of the user device 110 (e.g., a media control access (MAC) address), or various other appropriate identifiers. In various implementations, the identifier 114 may be passed with a user login request to the service provider server 130 via the network 160, and the identifier 114 may be used by the service provider server 130 to associate the user with a particular user account (e.g., and a particular profile) maintained by the service provider server 130.

In various implementations, the user 140 is able to input data and information into an input component (e.g., a keyboard) of the user device 110. For example, the user 140 may use the input component to submit third-party programming code to the service provider server 130.

While only one user device 110 is shown in FIG. 1, it has been contemplated that multiple user devices may be connected to the merchant server 120 and the service provider server 130 via the network 160. Different user devices may be associated with the same or different users.

The merchant server 120, in various embodiments, may be maintained by a business entity (or in some cases, by a partner of a business entity that processes transactions on behalf of business entity). Examples of business entities include merchants, resource information providers, utility providers, real estate management providers, social networking platforms, etc., which offer various items for purchase and process payments for the purchases. As shown, the merchant server 120 may include a merchant database 124 for identifying available items, which may be made available to the user device 110 for viewing and purchase by the user.

The merchant server 120, in one embodiment, may include a marketplace application 122, which may be configured to provide information over the network 160 to the user interface application 112 of the user device 110. In one embodiment, the marketplace application 122 may include a web server that hosts a merchant website for the merchant. For example, the user 140 of the user device 110 may interact with the marketplace application 122 through the user interface application 112 over the network 160 to search and view various items available for purchase in the merchant database 124. The merchant server 120, in one embodiment, may include at least one merchant identifier 126, which may be included as part of the one or more items made available for purchase so that, e.g., particular items are associated with the particular merchants. In one implementation, the merchant identifier 126 may include one or more attributes and/or parameters related to the merchant, such as business and banking information. The merchant identifier 126 may include attributes related to the merchant server 120, such as identification information (e.g., a serial number, a location address, GPS coordinates, a network identification number, etc.).

Each of the merchant servers 180 and 190 may be associated with a different business entity (or associated with a shopping platform that connects to multiple business entities), and may include similar components as the merchant server 120 as described above. While only three merchant servers 120, 180, and 190 is shown in FIG. 1, it has been contemplated that additional merchant servers, each associated with a different merchant, may be connected to the user device 110 and the service provider server 130 via the network 160.

The service provider server 130, in one embodiment, may be maintained by a transaction processing entity or an online service provider, which may provide processing for electronic transactions between the user 140 of user device 110 and one or more merchants. As such, the service provider server 130 may include a service application 138, which may be adapted to interact with the user device 110 and/or the merchant server 120 over the network 160 to facilitate the searching, selection, purchase, payment of items, and/or other services offered by the service provider server 130. In one example, the service provider server 130 may be provided by PayPal©, Inc., of San Jose, California, USA, and/or one or more service entities or a respective intermediary that may provide multiple point of sale devices at various locations to facilitate transaction routings between merchants and, for example, service entities.

In some embodiments, the service application 138 may include a payment processing application (not shown) for processing purchases and/or payments for electronic transactions between a user and a merchant or between any two entities. In one implementation, the payment processing application assists with resolving electronic transactions through validation, delivery, and settlement. As such, the payment processing application settles indebtedness between a user and a merchant, wherein accounts may be directly and/or automatically debited and/or credited of monetary funds in a manner as accepted by the banking industry.

The service provider server 130 may also include an interface server 134 that is configured to serve content (e.g., web content) to users and interact with users. For example, the interface server 134 may include a web server configured to serve web content in response to HTTP requests. In another example, the interface server 134 may include an application server configured to interact with a corresponding application (e.g., a service provider mobile application) installed on the user device 110 via one or more protocols (e.g., RESTAPI, SOAP, etc.). As such, the interface server 134 may include pre-generated electronic content ready to be served to users. For example, the interface server 134 may store a log-in page and is configured to serve the log-in page to users for logging into user accounts of the users to access various service provided by the service provider server 130. The interface server 134 may also include other electronic pages associated with the different services (e.g., electronic transaction services, etc.) offered by the service provider server 130. As a result, a user (e.g., the user 140 or a merchant associated with the merchant server 120, etc.) may access a user account associated with the user and access various services offered by the service provider server 130, by generating HTTP requests directed at the service provider server 130.

The service provider server 130, in one embodiment, may be configured to maintain one or more user accounts and merchant accounts in an account database 136, each of which may be associated with a profile and may include account information associated with one or more individual users (e.g., the user 140 associated with user device 110) and merchants. For example, account information may include private financial information of users and merchants, such as one or more account numbers, passwords, credit card information, banking information, digital wallets used, or other types of financial information, transaction history, Internet Protocol (IP) addresses, device information associated with the user account. In certain embodiments, account information also includes user purchase profile information such as account funding options and payment options associated with the user, payment information, receipts, and other information collected in response to completed funding and/or payment transactions.

In one implementation, a user may have identity attributes stored with the service provider server 130, and the user may have credentials to authenticate or verify identity with the service provider server 130. User attributes may include personal information, banking information and/or funding sources. In various aspects, the user attributes may be passed to the service provider server 130 as part of a login, search, selection, purchase, and/or payment request, and the user attributes may be utilized by the service provider server 130 to associate the user with one or more particular user accounts maintained by the service provider server 130 and used to determine the authenticity of a request from a user device.

In various embodiments, the service provider server 130 includes a logic integration module 132 that implements the logic integration system as discussed herein. The logic integration module 132 may be configured to integrate third-party logic associated with various third-party organizations, such as the merchants associated with the merchant servers 120, 180, and 190, within a transaction processing workflow associated with a transaction processing module of the service provider server 130. In some embodiments, the logic integration module 132 may receive different third-party programming code that implements the third-party logic of the third-party organizations, and may store the third-party programming code in a repository.

Figure 2:
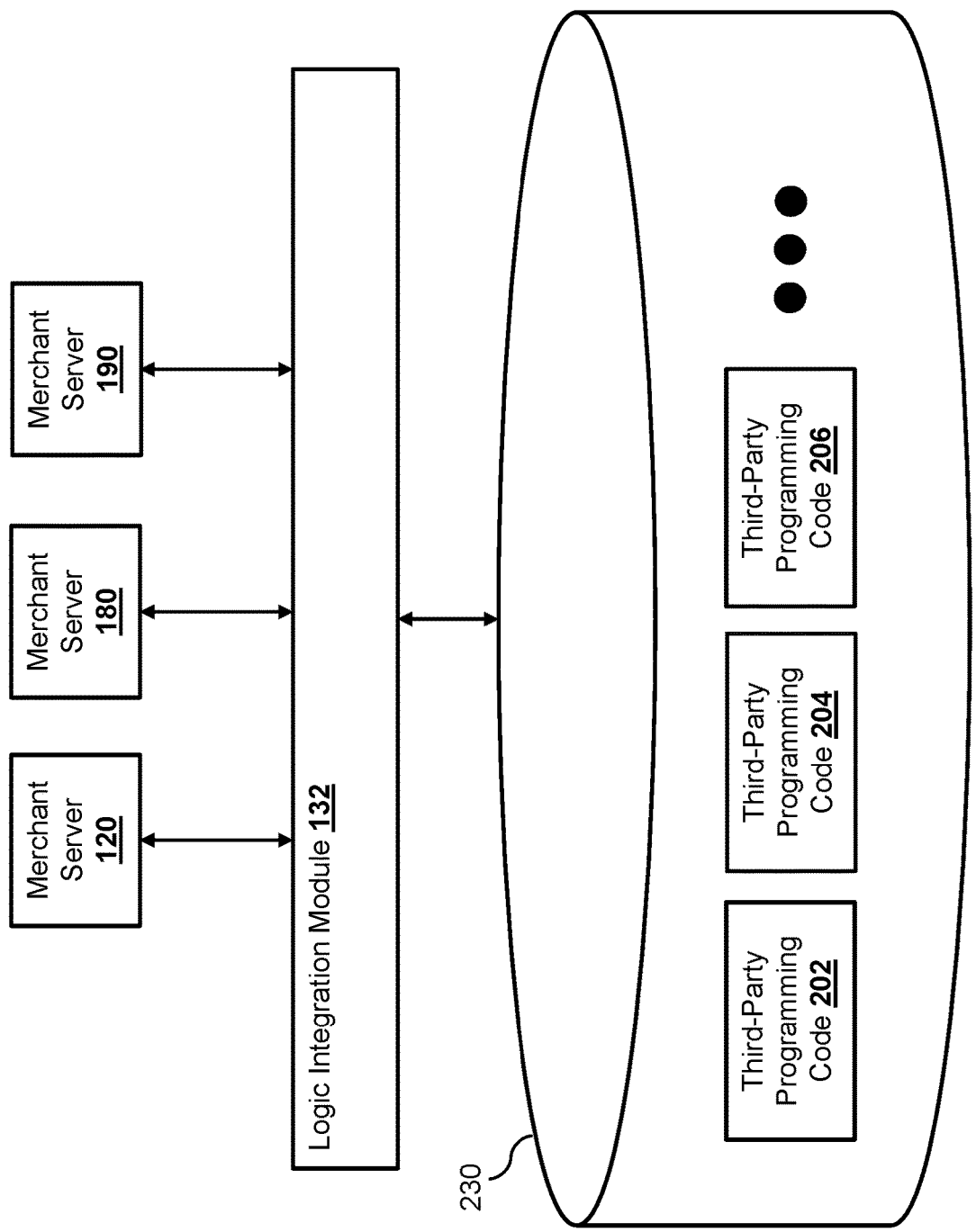
FIG. 2 illustrates a logic integration module obtaining third-party programming code from various merchant servers according to an embodiment of the present disclosure.

As shown in FIG. 2, the logic integration module 132 may be communicatively coupled to the merchant servers 120, 180, and 190. The logic integration module 132 may also provide an interface (e.g., a webpage, an API, etc.) that enables each of the merchants to submit third-party programming code to the service provider server 130. In some embodiments, the logic integration module 132 may provide a set of specifications for the third-party programming code, such as a set of input parameters (e.g., a payment card type, a payment card number, a payment card expiration, a shipping address, a billing address, etc.) and a set of output values (e.g., a binary output indicating acceptance or rejection, an error code, etc.). The logic integration module 132 may also specify additional requirements, such as programming languages used (e.g., Java®, JavaScript®, Python®, etc.), a length of the programming code, etc.

Through the interface provided by the logic integration module 132, the merchants may submit third-party programming code that implements customized third-party logic specific to the individual merchants. For example, a merchant associated with the merchant server 120 may implement third-party logic that rejects an electronic payment transaction when the shipping address is associated with a particular geographical region in third-party programming code 202. Another merchant associated with the merchant server 180 may implement third-party logic that rejects an electronic payment transaction when the expiration date of the payment card is within a time threshold (e.g., a month, etc.) in third-party programming code 204. Yet another merchant associated with the merchant server 190 may implement third-party logic that rejects an electronic payment transaction when the payment card is an American Express® payment card in third-party programming code 206. Upon receiving the third-party programming code 202, 204, and 206, the logic integration module 132 may store the third-party programming code 202, 204, and 206 in the repository 230. As illustrated in the examples here, each of the programming code 202, 204, and 206 may provide an output value (e.g., authorize or deny) based on a subset of the input parameters. However, it is conceivable that other third-party programming code may provide an output value based on the entire set of input parameters.

Figure 3:
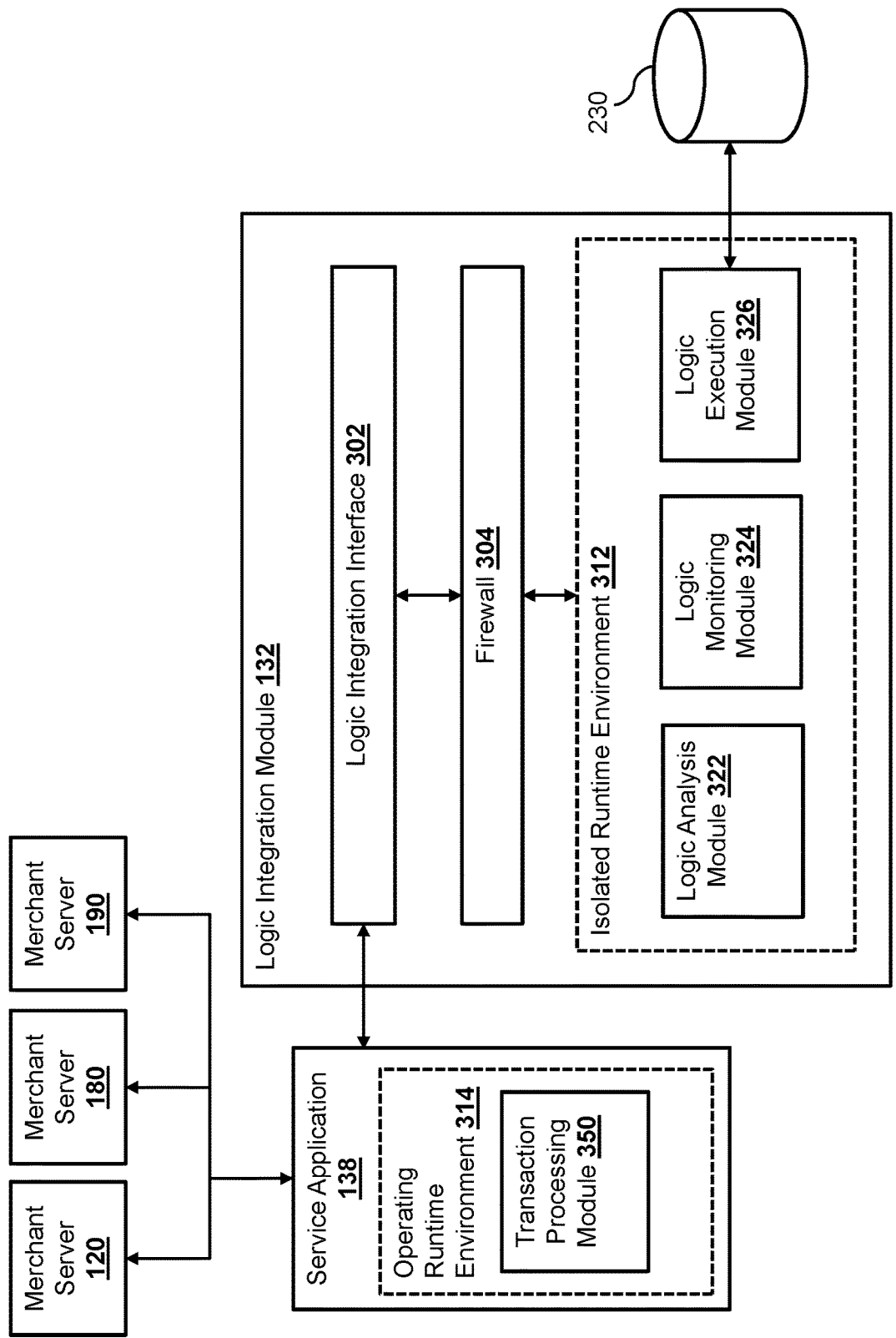
FIG. 3 is a block diagram illustrating a logic integration module according to an embodiment of the present disclosure.

FIG. 3 illustrates a block diagram of the logic integration module 132 according to an embodiment of the disclosure. The logic integration module 132 includes a logic integration interface 302, a firewall 304, a logic analysis module 322, a logic monitoring module 324, a logic execution module 326, and an isolated runtime environment 312. In some embodiments, the merchant servers 120, 180, and 190 may submit the third-party programming code 202, 204, and 206, respectively via the logic integration interface 302. Upon receiving the third-party programming code 202, 204, and 206, the logic analysis module 322 may analyze the third-party programming code 202, 204, and 206 to determine whether any error and/or malicious code is included in the third-party programming code 202, 204, and 206 before storing the code in the repository 230. The logic analysis module 322 may analyze each of the third-party programming code 202, 204, and 206 to detect whether any of the third-party programming code 202, 204, and 206 contains any error (e.g., not returning an output value, causing an infinite loop, etc.) and/or malicious code, such as code for accessing a variable other than one of the input parameters for the third-party programming code, accessing an external network, transmitting data to another device via a network, accessing system resources (e.g., system files, registry, etc.) that are not allowed, etc.

For example, the logic analysis module 322 may determine whether the third-party programming code accesses or otherwise uses a data variable that is not one of the input parameters for the third-party programming code. As discussed herein, the logic integration module 132 specifies a set of input parameters and a set of output values for the third-party programming code. Thus, the logic analysis module 322 may trace the programming statements in the third-party programming code to determine whether any of the programming statements use a data variable different from the set of input parameters. The logic analysis module 322 may also determine whether the third-party programming code is configured to return value(s) corresponding to the set of output values specified by the logic integration module 132.

The logic analysis module 322 may also determine whether the third-party programming code includes any network-related function calls (e.g., a call to transmit one or more of the input parameters to an external device or module, a network call such as "ping," domain name lookup, etc.) and/or system level function calls, as they are prohibited. The logic analysis module 322 may also determine whether the third-party programming code may cause issues/bugs, such as a potential infinite loop scenario. When the logic analysis module 322 detects errors and/or malicious code within the third-party programming code, the logic analysis module 322 may reject the third-party programming code. The logic analysis module 322 may not store the third-party programming code in the repository 230 and may transmit a notification indicating such a problem to the third-party organization (e.g., the merchant that submitted the third-party programming code).

The logic integration interface 302 is communicatively coupled to a transaction processing module 350 of the service application 138. In some embodiments, the transaction processing module 350 is configured to process electronic transactions for the merchant servers 120, 180, and 190. In some embodiments, the service application 138 may receive transaction processing requests from the merchant servers 120, 180, 190. The transaction processing requests may be a triggered by a redirection request from a user interface (e.g., a website, a mobile application interface) provided by the merchant servers 120, 180, and 190. For example, the user 140 may use the user device 110 to browse a website provided by the merchant server 120, and initiate an electronic payment transaction in association with a purchase of one or more items from the merchant through the website (e.g., by selecting a "check out" button of the website). Since the merchant server 120 is configured to offload the processing of the electronic payment transaction to the service provider server 130, the merchant server 120 may transmit an electronic transaction request to the service provider server 130 by redirecting the user 140 from the website of the merchant server 120 to a user interface of the service provider server 130. In response to receiving the electronic transaction request, the service application 138 may instantiate an instance of the transaction processing module 350 to process the electronic payment transaction.

In some embodiments, the service application 138 may instantiate the instance of the transaction processing module 350 in an operating runtime environment 314 that enables the instance of the transaction processing module 350 to process the electronic payment transaction. For example, the operating runtime environment 314 may enable the instance of the transaction processing module 350 to access network resources to communicate with external devices, such as the user device 110 of the user 140. The operating runtime environment 314 may also enable the instance of the transaction processing module 350 to access a software library that includes different modules and functionalities for access and processing data stored in the account database 136.

In some embodiments, the instance of the transaction processing module 350 may process the electronic payment transaction according to a workflow. According to the workflow, the instance of the transaction processing module 350 may provide a user interface on the user device 110. The instance of the transaction processing module 350 may prompt, via the user interface, the user 140 for additional information for processing the transaction. When the transaction is an electronic payment transaction, the instance of the transaction processing module 350 may prompt the user 140 for payment information such as a shipping address, a billing address, a payment card number, etc. When the transaction is a user authentication transaction, the instance of the transaction processing module 350 may prompt the user 140 for credential data such as an image of a fingerprint, an image of an iris, a password, etc. The instance of the transaction processing module 350 may process the transaction based on the additional information. For example, the instance of the transaction processing module 350 may compare the attributes of the transaction (e.g., the shipping address, the payment card information, etc.) to historic transactions in the account database 136, and may determine a risk of the transaction based on the comparison. In some embodiments, the instance of the transaction processing module 350 may determine whether to authorize or deny the transaction based at least in part on the risk.

While the instance of the transaction processing module 350 is being executed, the instance of the transaction processing module 350 and/or the logic integration module 132 may detect an interruption point within the workflow. In some embodiments, the interruption point may be implemented as specific programming code associated with the logic integration module 132 (e.g., a function call to a function of the logic integration module 132) being inserted within the source programming code of the transaction processing module 350. Upon detecting that the instance of the transaction processing module 350 has reached an interruption point, the logic integration module 132 may suspend the instance of the transaction processing module 350 and may determine whether third-party programming code corresponding to the merchant exists in the repository 230. If no such third-party programming code exists in the repository 230, the logic integration module 132 may resume the instance of the transaction processing module 350 such that the instance of the transaction processing module 350 may continue to process the transaction without using any third-party logic.

However, if such third-party programming code exists in the repository 230, the logic execution module 326 may execute a third-party programming code corresponding to the merchant. In this example, since the transaction processing request was submitted from the merchant server 120, the logic integration interface 302 may select the third-party programming code 202. The logic execution module 326 may then execute the third-party programming code 202 in the isolated runtime environment 312. In some embodiments, the logic execution module 326 may provide the third-party programming code 202 with the set of input parameters based on the data values generated or otherwise obtained by the instance of the transaction processing module 350. The set of data values may include a shipping address, a payment card number, a billing address, etc.

In some embodiments, the isolated runtime environment 312 may be separate from the operating runtime environment 314 in which the instance of the transaction processing module 350 is executed. For example, the isolated runtime environment 312 and the operating runtime environment 314 may be implemented within different physical computing devices or different virtual machines to insulate the executions of the third-party programming code and the execution of the instances of the transaction processing module 350. In some embodiments, the logic integration module 132 may configure the isolated runtime environment 312 such that the isolated runtime environment 312 is isolated from a network external to the service provider (e.g., the network 160). For example, the firewall 304 may be implemented between the isolated runtime environment 312 and any network resources of the device in which the isolated runtime environment 312 is implemented, such that any access to network resources (e.g., connecting to another networked device within the service provider server 130 or external to the service provider server 130, making any network-related calls, such as "pinging," domain name lookup, etc.) from any programs (e.g., any third-party programming code) being executed within the isolated runtime environment 312 will be passed through the firewall 304. The logic integration module 132 may configure the firewall 304 to prohibit (e.g., block) any outbound transmission from any programs (e.g., the third-party programming code 202) executed within the isolated runtime environment 312.

Furthermore, the logic integration module 132 of some embodiments may also configure the isolated runtime environment 312 as a restricted environment for execution of the third-party programming code. For example, the isolated runtime environment 312 may be configured to restrict the third-party programming code from accessing critical system resources such as a registry, system-level functionalities, operating system calls, etc. Any third-party programming code being executed within the isolated runtime environment 312 may also be assigned restricted rights (e.g., non-administrator level rights, etc.). When the third-party programming code 202 is being executed within the isolated runtime environment 312, the third-party programming code is allocated a fixed amount of memory for executing the third-party logic, but may be restricted from accessing any other memory space within the device in which the third-party programming code 202 is executed.

Thus, when the logic execution module 326 executes the third-party programming code 202 in the isolated runtime environment 312, the third-party programming code 202 is executed in an isolated environment and would not be able to tamper with the operation of the instance of the transaction processing module 350 and other services associated with the service provider server 130.

In some embodiments, for additional security measures, the logic monitoring module 324 may also monitor the execution of the third-party programming code 202. For example, the logic monitoring module 324 may monitor the computation and calls made by the third-party programming code 202 during its execution to determine any malicious activity being attempted by the third-party programming code 202. In some embodiments, the logic monitoring module 324 may analyze the resources being accessed by the third-party programming code 202, function call(s) being made the third-party code 202, etc. If the logic monitoring module 324 detects that the third-party programming code 202 attempts to perform any restricted activity (e.g., accessing data variables other than the input parameters, accessing an external network, transmitting data to another device via a network, accessing system resources, etc.), the logic monitoring module 324 may abort the execution of the third-party programming code 202. In addition, the logic monitoring module 324 may measure a lapse of time for executing the third-party programming code 202, and may timeout the execution of the third-party programming code 202 when the runtime of the third-party programing code exceeds a predetermined threshold (e.g., 0.5 seconds, 1 second, etc.). Having the execution of the third-party programming code 202 exceeding the predetermined threshold may indicate that the third-party programming code 202 includes a bug (e.g., in an infinite loop, etc.). The logic integration module 132 may then resume the workflow of the instance of the transaction processing module 350 and may provide an indication to the instance of the transaction processing module 350 that the third-party programming code 202 was aborted due to error such that the instance of the transaction processing module 350 may process the transaction using its default logic.

When execution of the third-party programming code 202 is completed, the logic integration interface 302 may resume the execution of the instance of the transaction processing module 350 at the interruption point. In some embodiments, when the third-party programming code 202 returns a set of output values, the logic integration interface 302 may pass the set of output values to the instance of the transaction processing module 350. The set of output values may include an indication of whether the transaction should be authorized or denied based on the third-party programming code 202. In some embodiments, when the third-party programming code 202 indicates that the transaction should be denied, the set of output values may also indicate a reason for the denial (e.g., the shipping address, the expiration date of the payment card, etc.). Thus, the instance of the transaction processing module 350 may continue to process the transaction based on the set of output values provided by the third-party programming code 202. When the third-party programming code 202 indicates that the transaction should be authorized, the instance of the transaction processing module 350 may process the transaction using its default process. For example, the instance of the transaction processing module 350 may evaluate a risk of the transaction based on the payment data, and may determine whether the electronic payment transaction should be authorized or denied. When it is determined that the electronic payment transaction should be authorized, the instance of the transaction processing module 350 may process the electronic payment transaction by transmitting data associated with the transaction to an issuing bank via a payment network based on the payment card data obtained from the user 140. When it is determined that the electronic payment transaction should be denied by the third-party logic, the instance of the transaction processing module 350 may deny the transaction by transmitting a transaction denied indication to the merchant server 120 and/or the user device 110, even though the transaction processing module 350 would have authorized the transaction based on its default processing without using the third-party logic.

When the third-party programming code 202 indicates that the transaction should be denied, the instance of the transaction processing module 350 may deny the electronic payment transaction even though the instance of the transaction processing module 350 would have authorized the transaction when the output values of the third-party programming code 202 are not considered. For example, the third-party programming code 202 may indicate that the transaction should be denied because the merchant associated with the merchant server 120 does not support shipping items to a geographical region associated with the shipping address in the transaction. Thus, the merchant may contribute to the process of processing the electronic payment transaction through the third-party programming code 202. Since the third-party programing code 202 is executed in the isolated runtime environment 312 and all of the data accessible by the third-party programming code 202 remains in the isolated runtime environment 312 (and not accessible by the merchant server 120), the merchant can avoid the risk and burden of processing, handling, and/or storing any sensitive data associated with the transaction.

The instance of the transaction processing module 350 may transmit a transaction deny notification to the merchant server 120 and/or the user device 110. When the set of output values provided by the third-party programming code 202 also indicates a reason for the denial (e.g., the shipping address), the instance of the transaction processing module 350 may also indicate to the merchant server 120 and/or the user device 110 the reason for the denial. In some embodiments, the instance of the transaction processing module 350 may enable the user 140 to correct the problem by resubmitting another set of data (e.g., resubmitting a new shipping address, new payment card information, etc.) via the user interface provided by the instance of the transaction processing module 350.

Figure 4:
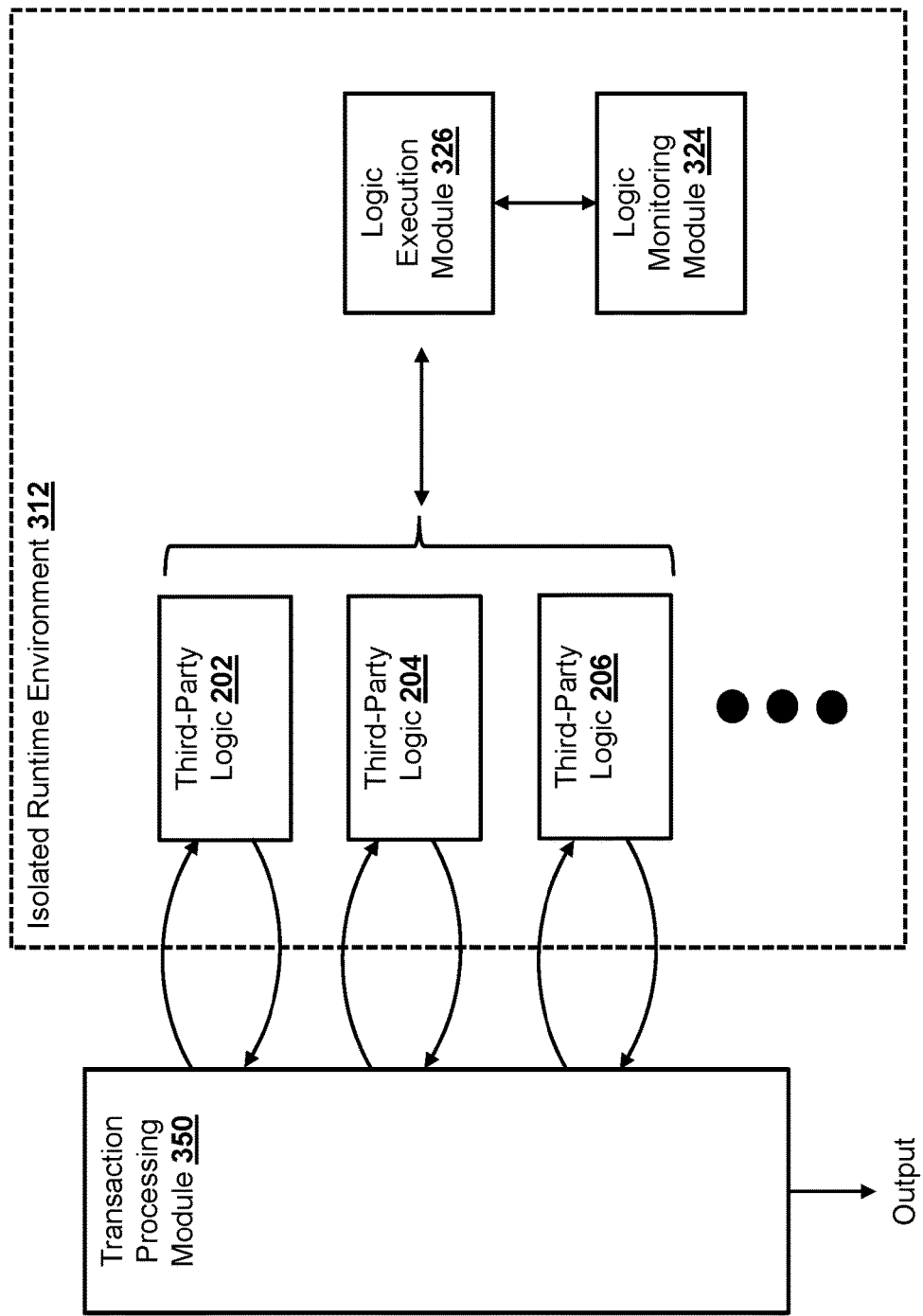
FIG. 4 illustrates the dynamic executions of different customized third-party programming code for transaction requests received from different third-party servers according to an embodiment of the present disclosure.

FIG. 4 illustrates that different third-party programming code may be executed based on different instances of the transaction processing module 350 for processing different transactions. As discussed herein, based on different transaction processing requests submitted by different merchant servers 120, 180, and 190, different instances of the transaction processing module 350 may be instantiated by the service application 138 for processing the corresponding electronic transactions. When the instances of the transaction processing module 350 reach their respective interruption points, the logic integration interface 302 may select, based on the origin of the transaction processing request, a particular third-party programming code for execution within the isolated runtime environment 312. For example, the logic integration interface 302 may select the third-party programming code 202 for processing the transaction when the transaction processing request was submitted by the merchant server 120, the logic integration interface 302 may select the third-party programming code 204 for processing the transaction when the transaction processing request was submitted by the merchant server 180, and the logic integration interface 302 may select the third-party programming code 206 for processing the transaction when the transaction processing request was submitted by the merchant server 190. The logic execution module 326 may execute the third-party programming code 202, 204, and 206. The third-party programing code 202, 204, and 206 may produce a set of output values that indicate an authorization or denial of the transaction based on data associated with the transaction, such as the shipping address (e.g., for the third-party programming code 202), the expiration date of the payment card (e.g., for the third-party programming code 204), and a payment card type of the payment card (e.g., for the third-party programming code 206). The instances of the transaction processing module 350 may use the output values provided by the respective third-party programming code to process the respective transactions differently.

For example, based on the third-party programming code 202, an instance of the transaction processing module 350 may process a transaction based on the additional shipping address criterion corresponding to the third-party programming code 202. Based on the third-party programming code 204, another instance of the transaction processing module 350 may process a transaction based on the additional payment card expiration date criterion corresponding to the third-party programming code 204. Based on the third-party programming code 206, another instance of the transaction processing module 350 may process a transaction based on the additional payment card type criterion corresponding to the third-party programming code 206. Thus, customized transaction processing logic can be provided to different merchants without having the different merchants implement their own transaction processing modules and without having the different merchants incur risks of processing, handling, and/or storing sensitive data.

Figure 5:
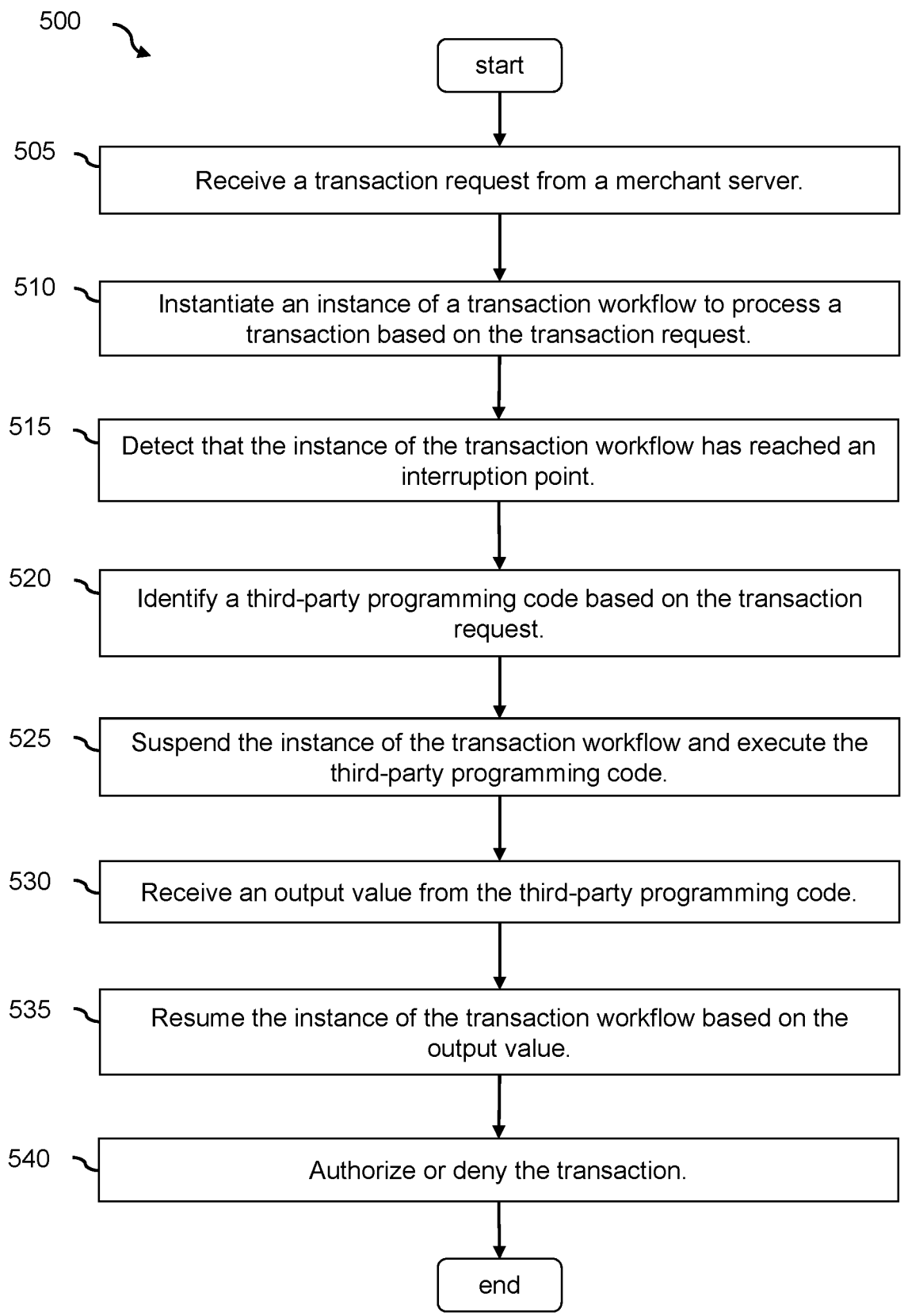
FIG. 5 is a flowchart showing a process of integrating third-party logic within a transaction processing workflow according to an embodiment of the present disclosure.

FIG. 5 illustrates a process 500 for integrating third-party logic into a transaction processing workflow according to various embodiments of the disclosure. In some embodiments, at least a portion of the process 500 may be performed by the logic integration module 132 and the service application 138 of the service provider server 130. The process 500 begins by receiving (at step 505) a transaction request from a merchant server. For example, the service application 138 may receive a transaction request from one of the merchant servers 120, 180, and 190. The transaction request may be received in the form of an HTTP redirect request from a merchant website associated with one of the merchant servers 120, 180, and 190 displayed on the user device 110 of the user 140.

Upon receiving the transaction request, the process 500 instantiates (at step 510) an instance of a transaction workflow to process a transaction based on the transaction request. For example, the service application 138 may instantiate an instance of the transaction processing module 350 to process a transaction based on the transaction request. The instance of the transaction processing module 350 may begin processing the transaction according to a transaction processing workflow. The instance of the transaction processing module 350 may provide a user interface to the user 140 on the user device 110. The instance of the transaction processing module 350 may prompt the user 140, via the user interface, for additional information for processing the transaction. For example, when the transaction is an electronic payment transaction, the instance of the transaction processing module 350 may prompt the user 140 for payment information such as a shipping address, a billing address, a payment card number, a payment card type, an expiration date of the payment card, etc. When the transaction is a user authentication transaction, the instance of the transaction processing module 350 may prompt the user 140 for credential data such as a password, an image of a fingerprint, an image of an iris, etc.

The process 500 then detects (at step 515) that the instance of the transaction workflow has reached an interruption point and identifies (at step 520) a third-party programming code based on the transaction request. Upon detecting that the instance of the transaction workflow has reached an interruption point, the process suspends (at step 525) the instance of the transaction workflow and executes the third-party programming code. For example, the instance of the transaction processing module 350 and/or the logic integration module 132 may detect that the instance of the transaction processing module 350 has reached an interruption point. The logic integration module 132 may identify, among the different programming code 202, 204, and 206 that is associated with the different merchant servers 120, 180, and 190, a particular third-party programing code for processing the transaction.

The logic integration module 132 may suspend the instance of the transaction processing module 350, and the logic execution module 326 may execute the particular third-party programing code within the isolated runtime environment 312. When the execution of the particular third-party programming code is completed, the particular third-party programming code may return a set of output values indicating whether the transaction should be authorized or denied.

As such, the process 500 receives (at step 530) an output value from the third-party programming code and resumes (at step 535) the instance of the transaction workflow based on the output value. For example, the logic integration interface 302 may pass the set of output values to the instance of the transaction processing module 350 when the execution of the particular third-party programming code is completed. The instance of the transaction processing module 350 may resume the transaction processing workflow at the interruption point. The instance of the transaction processing module 350 may continue to process the transaction based on the set of output values provided by the particular third-party programming code.

In some embodiments, instead of suspending the instance of the transaction workflow, the process 500 may continue to run (execute) the instance of the transaction and execute the third-party programming code in parallel. Upon receiving the output value from the third-party programming code, the output value may be provided to the instance of the transaction workflow at the time to enable the instance of the transaction workflow to continue execution based on the output value from the third-party programing code.

The process then authorizes or denies (at step 540) the transaction. For example, the instance of the transaction processing module 350 may authorize or deny the transaction based in part on the set of output values by the particular third-party programing code.

While the examples illustrated herein describe integrating third-party logic associated with merchants into electronic payment transactions, the logic integration system as disclosed herein can be applied to integrate third-party logic into other types of transactions as well. For example, the logic integration system may be used to integrate third-party logic associated with different online service providers (e.g., data centers, government portals, etc.) into user authentication transactions, such that the different online service providers can supplement the user authentication transaction processing with customized logic without incurring the risk and burden of implementing the user authentication transaction processing module and handling/storing of sensitive data.

Figure 6:
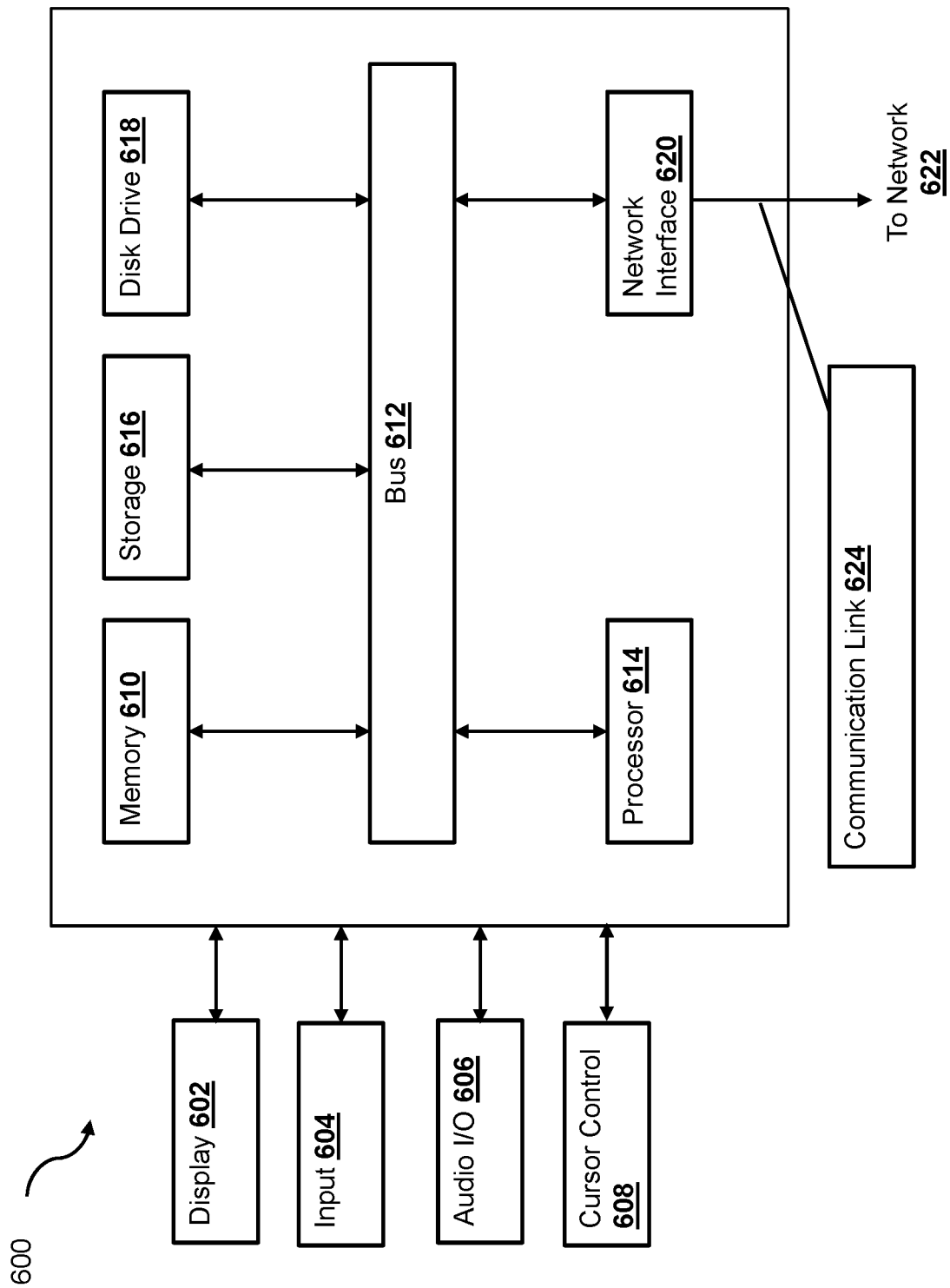
FIG. 6 is a block diagram of a system for implementing a device according to an embodiment of the present disclosure.

FIG. 6 is a block diagram of a computer system 600 suitable for implementing one or more embodiments of the present disclosure, including the service provider server 130, the merchant servers 120, 180 and 190, and the user device 110. In various implementations, the user device 110 may include a mobile cellular phone, personal computer (PC), laptop, wearable computing device, etc. adapted for wireless communication, and each of the service provider server 130, and the merchant servers 120, 180 and 190 may include a network computing device, such as a server. Thus, it should be appreciated that the devices 110, 120, 130, 180, and 190 may be implemented as the computer system 600 in a manner as follows.

The computer system 600 includes a bus 612 or other communication mechanism for communicating information data, signals, and information between various components of the computer system 600. The components include an input/output (I/O) component 604 that processes a user (i.e., sender, recipient, service provider) action, such as selecting keys from a keypad/keyboard, selecting one or more buttons or links, etc., and sends a corresponding signal to the bus 612. The I/O component 604 may also include an output component, such as a display 602 and a cursor control 608 (such as a keyboard, keypad, mouse, etc.). The display 602 may be configured to present a login page for logging into a user account or a checkout page for purchasing an item from a merchant. An optional audio input/output component 606 may also be included to allow a user to use voice for inputting information by converting audio signals. The audio I/O component 606 may allow the user to hear audio. A transceiver or network interface 820 transmits and receives signals between the computer system 600 and other devices, such as another user device, a merchant server, or a service provider server via a network 622, such as network 160 of FIG. 1. In one embodiment, the transmission is wireless, although other transmission mediums and methods may also be suitable. A processor 614, which can be a micro-controller, digital signal processor (DSP), or other processing component, processes these various signals, such as for display on the computer system 600 or transmission to other devices via a communication link 624. The processor 614 may also control transmission of information, such as cookies or IP addresses, to other devices.

The components of the computer system 600 also include a system memory component 610 (e.g., RAM), a static storage component 616 (e.g., ROM), and/or a disk drive 618 (e.g., a solid-state drive, a hard drive). The computer system 600 performs specific operations by the processor 614 and other components by executing one or more sequences of instructions contained in the system memory component 610. For example, the processor 614 can perform the logic integration functionalities described herein according to the process 500.

Logic may be encoded in a computer readable medium, which may refer to any medium that participates in providing instructions to the processor 614 for execution. Such a medium may take many forms, including but not limited to, non-volatile media, volatile media, and transmission media. In various implementations, non-volatile media includes optical or magnetic disks, volatile media includes dynamic memory, such as the system memory component 610, and transmission media includes coaxial cables, copper wire, and fiber optics, including wires that comprise the bus 612. In one embodiment, the logic is encoded in non-transitory computer readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by the computer system 600. In various other embodiments of the present disclosure, a plurality of computer systems 600 coupled by the communication link 624 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems comprising one or more memories storing various information described herein and one or more processors coupled to the one or more memories and a network, wherein the one or more processors are operable to perform steps as described herein, as non-transitory machine-readable medium comprising a plurality of machine-readable instructions which, when executed by one or more processors, are adapted to cause the one or more processors to perform a method comprising steps described herein, and methods performed by one or more devices, such as a hardware processor, user device, server, and other devices described herein.

What is claimed is:

1. A system, comprising:
   one or more hardware processors;
   a data storage storing a plurality of programming codes corresponding to a plurality of third-party entities, wherein each programming code in the plurality of programming codes comprises logic that is provided by a corresponding third-party entity; and
   a non-transitory memory storing instructions that, when executed by the one or more hardware processors, cause the one or more hardware processors to perform operations comprising:
      receiving an electronic transaction request from a device;
      initiating a transaction processing workflow within a first runtime environment for processing an electronic transaction associated with the electronic transaction request;
      obtaining, via a user interface on the device and based on the transaction processing workflow, transaction data associated with the electronic transaction;
      selecting, from the plurality of programming codes stored in the data storage, a particular programming code for the electronic transaction based on at least one of the electronic transaction request or the transaction data;
      suspending the transaction processing workflow;
      while the transaction processing workflow is suspended, executing the particular programming code in a second runtime environment, wherein the second runtime environment is isolated from the first runtime environment;
      providing, to the second runtime environment executing the particular programming code via an application programming interface, at least a portion of the transaction data, wherein the particular programming code is configured to generate an output value based on the at least the portion of the transaction data;
      obtaining the output value generated by the particular programming code executed in the second runtime environment;
      resuming the transaction processing workflow; and
      processing the electronic transaction according to the transaction processing workflow and based at least in part on the output value.

2. The system of claim 1, wherein the electronic transaction request is received based on a redirection of the device from a third-party entity user interface to the user interface.

3. The system of claim 1, wherein the suspending the transaction processing workflow is in response to detecting that the transaction processing workflow has reached an interruption point.

4. The system of claim 1, wherein the second running environment is a secured environment having limited access to resources associated with the system.

5. The system of claim 1, wherein the operations further comprise:
   allocating, from a computer memory associated with the second runtime environment, a first portion of the computer memory for the executing the particular programming code, wherein the particular programming code is restricted from accessing a second portion of the computer memory.

6. The system of claim 1, wherein the output value indicates whether to authorize or deny the electronic transaction request.

7. The system of claim 1, wherein the operations further comprise:
   analyzing the plurality of programming codes before storing the plurality of programming codes in the data storage.

8. A method, comprising:
   initiating, by a computer system, a transaction processing workflow within a first runtime environment based on an electronic transaction request received from a device;
   selecting, from a plurality of programming codes stored in a data storage, a particular programming code for an electronic transaction associated with the electronic transaction request based on data associated with the electronic transaction request, wherein each programming code in the plurality of programming codes comprises logic that is provided by a corresponding entity;
   obtaining, via a user interface on the device and based on the transaction processing workflow, transaction data associated with the electronic transaction;
   in response to detecting that the transaction processing workflow has reached an interruption point, suspending the transaction processing workflow;
   while the transaction processing workflow is suspended, executing, by the computer system, the particular programming code in a second runtime environment, wherein the second runtime environment is isolated from the first runtime environment;
   providing, to the second runtime environment executing the particular programming code via an application programming interface, at least a portion of the transaction data, wherein the particular programming code is configured to generate an output value based on the at least the portion of the transaction data;

obtaining the output value generated by the particular programming code executed in the second runtime environment;

resuming, by the computer system, the transaction processing workflow; and processing, by the computer system, the electronic transaction according to the transaction processing workflow and based at least in part on the output value.

9. The method of claim 8, wherein the electronic transaction is an electronic payment transaction, and wherein the transaction data comprises payment data associated with a funding instrument.

10. The method of claim 8, wherein the electronic transaction is an authentication transaction, and wherein the transaction data comprises personal credential data.

11. The method of claim 8, further comprising restricting the particular programming code from transmitting data to the computer system outside of the second runtime environment.

12. The method of claim 8, further comprising:

monitoring the executing of the particular programming code within the second runtime environment;

detecting a function call made by the particular programming code; and determining whether the function call is associated with a restricted activity.

13. The method of claim 12, further comprising:

aborting the executing of the particular programming code in response to determining that the function call is associated with the restricted activity.

14. The method of claim 8, wherein the processing the electronic transaction is further based on the transaction data.

15. A non-transitory machine-readable medium having stored thereon machine-readable instructions executable to cause a machine to perform operations comprising:

receiving an electronic transaction request in association with an electronic transaction conducted via a device;

initiating a transaction processing workflow within a first runtime environment for processing the electronic transaction;

obtaining, via a user interface on the device and based on the transaction processing workflow, transaction data associated with the electronic transaction;

selecting, from a plurality of programming codes stored in a data storage, a particular programming code for the electronic transaction based on at least one of the electronic transaction request or the transaction data, wherein each programming code in the plurality of programming codes comprises logic that is provided by a corresponding entity;

suspending the transaction processing workflow;

while the transaction processing workflow is suspended, executing the particular programming code in a second runtime environment, wherein the second runtime environment is isolated from the first runtime environment;

providing, to the second runtime environment executing the particular programming code executed in the second runtime environment via an application programming interface, at least a portion of the transaction data, wherein the particular programming code is configured to generate an output value based on the at least the portion of the transaction data;

obtaining the output value generated by the particular programming code executed in the second runtime environment; and processing the electronic transaction according to the transaction processing workflow and based at least in part on the output value.

16. The non-transitory machine-readable medium of claim 15, wherein the operations further comprise transmitting, to a server corresponding to the particular programming code, a result from the processing the electronic transaction.

17. The non-transitory machine-readable medium of claim 15, wherein the operations further comprise restricting the particular programming code from accessing a service associated with the first runtime environment based on the particular programming code being executed within the second runtime environment.

18. The non-transitory machine-readable medium of claim 15, wherein the particular programming code is a first programming code, and wherein the operations further comprise:

in response to receiving a second electronic transaction request via a second device, selecting, from the plurality of programming codes stored in the data storage, a second programming code for a second electronic transaction associated with the second electronic transaction request;

executing the second programming code in the second runtime environment; and processing, by the computer system, the second electronic payment transaction based at least in part on a second output value obtained from the executing the second programming code.

19. The non-transitory machine-readable medium of claim 15, wherein the operations further comprise transmitting, to the particular programming code via the application programming interface, a set of attributes associated with the electronic transaction, wherein the particular programming code is further configured to generate the output value based on the set of attributes.

20. The non-transitory machine-readable medium of claim 15, wherein the processing comprises authorizing, denying, or further processing the electronic transaction based at least in part on the output value.

* * * * *